(12) United States Patent
Inaba

(10) Patent No.: US 6,970,911 B2
(45) Date of Patent: Nov. 29, 2005

(54) DISTRIBUTED MEMORY TYPE PARALLEL COMPUTER AND WRITE DATA TRANSFER END CONFIRMING METHOD THEREOF

(75) Inventor: Masanobu Inaba, Yamanashi (JP)

(73) Assignee: NEC Corporation, Tokyo (JP)

( * ) Notice: Subject to any disclaimer, the term of this patent is extended or adjusted under 35 U.S.C. 154(b) by 809 days.

(21) Appl. No.: 09/789,724

(22) Filed: Feb. 22, 2001

(65) Prior Publication Data

US 2001/0021944 A1 Sep. 13, 2001

(30) Foreign Application Priority Data

Feb. 23, 2000 (JP) ........................................ 2000-052124

(51) Int. Cl.[7] ............................................. G06F 15/167
(52) U.S. Cl. ........................ 709/213; 709/201; 709/217
(58) Field of Search ................................ 709/201, 213, 709/217

(56) References Cited

U.S. PATENT DOCUMENTS

| | | | | |
|---|---|---|---|---|
| 5,235,595 A | * | 8/1993 | O'Dowd ...................... | 370/392 |
| 5,274,762 A | | 12/1993 | Peterson et al. | |
| 5,638,516 A | * | 6/1997 | Duzett et al. ................ | 709/239 |
| 5,659,784 A | * | 8/1997 | Inaba et al. .................. | 710/200 |
| 5,692,136 A | * | 11/1997 | Date et al. ................... | 710/107 |
| 5,742,843 A | * | 4/1998 | Koyanagi et al. ............. | 712/14 |
| 5,835,492 A | | 11/1998 | Aimoto et al. | |
| 5,960,209 A | * | 9/1999 | Blount et al. ................. | 712/1 |
| 2003/0108053 A1 | * | 6/2003 | Inaba .......................... | 370/400 |

FOREIGN PATENT DOCUMENTS

| | | |
|---|---|---|
| JP | 4-291660 A | 10/1992 |
| JP | 2000-112912 A | 4/2000 |

* cited by examiner

Primary Examiner—Reba I. Elmore
(74) Attorney, Agent, or Firm—Foley & Lardner LLP

(57) ABSTRACT

A distributed memory type parallel computer and a write data transfer end confirming method of the distributed memory type parallel computer, in which a series of processes to confirm a write data transfer end between plural computing nodes can be made in high speed, are provided. A computing node in the distributed memory type parallel computer provides a request accepting section, a data accepting section, an arbitration section, an address transforming section, a request/data outputting section, an EOT (end of transfer) judging section, and a selector. By using the EOT judging section and the selector in a remote node, a transfer end mark can be added to transfer data themselves. Therefore, without executing processes before and after write data transfer by a CPU in a local node, an end confirmation of a write data transfer from the remote node to the local node can be realized by adding a transfer end mark to the transfer data. With this, a series of the processes to confirm the write data transfer end can be executed in high speed.

10 Claims, 7 Drawing Sheets

DISTRIBUTED MEMORY TYPE PARALLEL COMPUTER AND WRITE DATA TRANSFER END CONFIRMING METHOD THEREOF

BACKGROUND OF THE INVENTION

The present invention relates to a distributed memory type parallel computer and a write data transfer end confirming method thereof, in particular, in which a CPU (central processing unit) in a local computing node has a main role and a write data transfer is executed from the local computing node to a remote computing node, and a CPU in the remote computing node confirms the end of a write data transfer.

DESCRIPTION OF THE RELATED ART

A distributed memory type parallel computer, in which plural processing units (computing nodes) are operated at the same time and at high transfer rates, has been developed.

When computation is executed by this distributed memory type parallel computer, it is desirable that the number of times of write data transfer between computing nodes is small. That is, it is desirable that a closed program is executed in each of the computing nodes since the computing nodes are connected through a network and the distance between the computing nodes is longer than that in one computing node.

However, when a large scale technical subject is computed, it is almost impossible that this computation is executed only by the closed program in one computing node, and actually this computation is executed in cooperation with programs of plural computing nodes. For example, in case a large-scale technical subject array is allocated to plural computing nodes by mapping applied to plural computing nodes as a global memory space, the computation is executed in cooperation with the plural computing nodes.

FIG. 1 is a block diagram showing a structure of a conventional distributed memory type parallel computer. As shown in FIG. 1, at the conventional distributed memory type parallel computer, a first computing node 1 and a second computing node 2 are connected through a network 3. In this, the first computing node 1 that generates a command is named as a local node 1, and the second computing node 2 that receives the generated command is named as a remote node 2.

The local node 1 consists of a CPU 11, a PMU (primary memory unit) 12, and a RCU (remote control unit) 13. The remote node 2 consists of a CPU 21, a PMU 22, and a RCU 23 as the local node 1. A network 3 connects the local node 1 and the remote node 2, and provides a coPMUnication register 31 for synchronizing operation between the local node 1 and the remote node 2. In this, the RCU 13 receives commands from the CPU 11 through the PMU 12, and the RCU 23 receives commands from the CPU 21 through the PMU 22.

At the local node 1, the CPU 11 loads the PMU 12 with data and makes the PMU 12 store the data, and computes by using the loaded data and makes the PMU 12 store the computed result. The RCU 13 receives a write data transfer command between computing nodes from the CPU 11, and executes a write data transfer between computing nodes in cooperation with the RCU 23 in the remote node 2.

For example, when the CPU 11 commands the RCU 13 to transfer the data in the PMU 12 to the PMU 22 in the remote node 2, the RCU 13 loads the data in the PMU 12 and transfers the data to the RCU 23 through the network 3. The RCU 23 makes the PMU 22 store the transferred data. This operation is called a write data transfer between computing nodes.

And when the CPU 11 commands the RCU 13 to transfer the data in the PMU 22 in the remote node 2 to the PMU 12, the RCU 13 sends a write data transfer request to the RCU 23. The RCU 23 loads the data in the PMU 22 and transfers the data to the RCU 13 through the network 3. The RCU 13 makes the PMU 12 store the transferred data. This operation is called a read data transfer between computing nodes.

FIG. 2 is a block diagram showing a detailed structure of the RCU 13 (23) in the computing node 1 (2) of the conventional distributed memory type parallel computer. As shown in FIG. 2, the RCU 13 (23) of the conventional distributed memory type parallel computer consists of a request accepting section 131 (231), a data accepting section 132 (232), an arbitration section 133 (233), an address transforming section 134 (234), and a request/data outputting section 135 (235).

The request accepting section 231 in the RCU 23 accepts a command from the CPU 21, or a command and an address from the RCU 13 through the network 3 and latches the command and the address. The data accepting section 232 in the RCU 23 accepts write data transferred from the RCU 13 through the network 3 and latches the data. The arbitration section 233 selects one of the requests (commands and addresses) in the request accepting section 231 one by one by arbitrating.

The address transforming section 234 transforms a logical node number into a physical node number, and a local job number into a remote job number, and a logical address in the node into a physical address in the node. More specifically, the physical node number transformation and the remote job number transformation are needed for a command when the remote node 2 accesses the other node (in this case, the local node 1). The physical address in a node transformation is needed for a command accessing a memory in the node (in this case, the PMU 22).

The request/data outputting section 235 outputs the command and address transformed at the address transforming section 234 and the loaded data from the PMU 22 to the other node (the RCU 13 through the network 3). The data handled at the data accepting section 232 is needed in case the data is to be stored in the PMU 22 from the other node (the RCU 13 through the network 3).

Generally, a program, in which a local node generates a write data transfer command and its write data transfer end confirmation is executed at a remote node, is shown in the following program.

Local node program:
FLAG=1
DO 1=1, M
NODE 2 (I+J)=NODE 1 (I)
END DO
FLAG=0
Remote node program:
IF FLAG .eq. 0 THEN
CALL NEXT_PROGRAM_SUB
END IF The program at the distributed memory type parallel computer is generally described by one program using an MPI (message passing interface) and a HPF (high performance Fortran). However, in order to make the understanding of it easy, the program description of each of the computing nodes is done seperately.

In a conventional distributed memory type parallel computer, an array NODE 1 (I) is made to be mapping to the local node 1, an array NODE 2 (I+J) is made to be mapping to the remote node 2, and a parent process is made to be the CPU 11 in the local node 1.

And a synchronizing flag FLAG showing a write data transferring state is made to be mapping in the communication register 31 in the network 3. In this, FLAG="1" is defined to be that write data are transferring, and FLAG="0" is defined to be that the write data transfer ends.

A case, in which an array copy is allocated to plural computing nodes and the process at one of the computing nodes allocated the array copy can jump to a next subroutine after the copy is ended, is explained.

In the program mentioned above, the array NODE 1 (I) is copied to the array NODE 2 (I+J), and when the copy is ended, that is, after confirming that the value of FLAG was changed from "1" to "0", the program can jump to the next subroutine.

In this case, the array NODE 1 (I) is made to be mapping to the local node 1, the array NODE 2 (I+J) is made to be mapping to the remote node 2, and the flag FLAG is made to be mapping in the communication register 31 in the network 3 located at the same distance from the local node 1 and the remote node 2. The parent process is made to be the CPU 11 in the local node 1.

In this case, the CPU 11 in the local node 1 issues a flag set command being FLAG="1", a write data transfer command between computing nodes, and a flag clear command being FLAG="0".

FIG. 3 is a timing chart showing operation of the conventional distributed memory type parallel computer. Referring to FIG. 3, the operation of the local node 1 and the remote node 2 at the conventional distributed memory type parallel computer is explained.

First, at the local node 1, in order to inform the CPU 21 that data is transferring to the remote node 2 from the local node 1, the CPU 11 issues a write data transfer command to the RCU 13 for the communication register 31 in the network 3.

At the RCU 13, the request accepting section 131 accepts the write data transfer command for the communication register 31 from the CPU 11, and the arbitration section 133 arbitrates the request (write data transfer command). After this, the request/data outputting section 135 outputs the request to the network 3.

At the network 3, the FLAG of the communication register 31 is set to "1", and an end reply signifying that the write process to the FLAG normally ended is returned to the RCU 13. The RCU 13 informs the CPU 11 of this end reply, and the write process to the communication register 31 ends.

Next, the CPU 11 issues a write data transfer command to the RCU 13 for the PMU 22 in the remote node 2.

At the RCU 13, the request accepting section 131 accepts the write data transfer command from the CPU 11, and the arbitration section 133 arbitrates the request (write data transfer command). After this, the address transforming section 134 executes the physical node number transformation, the remote job number transformation, and the physical address in node transformation, and the RCU 13 accesses the PMU 12. After this, the RCU 13 outputs the loaded data from the PMU 12 together with the physical node number and the remote job number to the RCU 23 through the network 3 from the request/data outputting section 135.

Next, at the remote node 2, the RCU 23 accepts the write data transfer command sent from the RCU 13 through the network 3 at the request accepting section 231, and the arbitration section 233 arbitrates the request (write data transfer command). After this, the address transforming section 234 transforms the logical address into the physical address. And the transferred data are accepted at the data accepting section 232 and are written in the PMU 22 together with the physical address.

The RCU 23 sends an end reply, which signifies that the write data transfer command from the RCU 13 and the writing process of the transferred data to the PMU 22 end normally, to the RCU 13 through the network 3 from the request/data outputting section 235. The RCU 13 returns this end reply to the CPU 11, and the write data transfer command ends.

Next, in order to notify that the write data transfer ended to the CPU 21 in the remote node 2, the CPU 11 issues a flag write command to the RCU 13 for the communication register 31 in the network 3.

The RCU 13 accepts the flag write command to the communication register 31 at the request accepting section 131, and the arbitration section 133 arbitrates the request (flag write command). After this, the request/data outputting section 135 outputs the flag write command to the network 3.

At the network 3, the FLAG of the communication register 31 is cleared to "0", and an end reply signifying that the flag write process normally ended is returned to the RCU 13. The RCU 13 informs the CPU 11 of this end reply, and the write process to the communication register 31 ends.

Next, the operation of the remote node 2 is explained. At the remote node 2, the CPU 21 issues a flag read command to the RCU 23 for the communication register 31. At the RCU 23, the request accepting section 231 accepts the flag read command to the communication register 31. And the arbitration section 233 arbitrates the request (flag read command), after this, the request/data outputting section 235 outputs the flag read command to the network 3.

At the network 3, the FLAG value in the communication register 31 is read, and an end reply, which signifies that reading the FLAG value and the FLAG reading process are executed normally, is returned to the RCU 23. The RCU 23 informs the CPU 21 of this result. And the flag reading process in the communication register 31 in the network 3 ends.

This FLAG reading process is repeated until the FLAG value becomes "0", that is, until the end of the write data transfer is confirmed. And when it was confirmed that the FLAG value had become "0", the CPU 21 goes to the next sequence, (NEXT_PROGRAM_SUM). With this, a series of the operation of the conventional distributed memory type parallel computer ends.

At this time, at the conventional distributed memory type parallel computer, the latency in each of the units and between the units is expediently defined as follows. In this, T corresponds to one machine clock at the distributed memory type parallel computer.

1. The latency between the CPU (11,21) and the PMU (12,22): 1T
2. The latency between the PMU (12,22) and the RCU (13,23): 1T
3. The latency between the network 3 and the RCU (13,23): 3T
4. The latency passing through each of the units: 0T Therefore, as shown in FIG. 3, at the conventional distributed memory type parallel computer, the total latency in the write data transfer from issuing the write data transfer command at the CPU 11 to confirming the end of the write data transfer at the CPU 22 requires 62T. That is, the latency until the CPU 21 confirms that the FLAG "0".

However, at the conventional distributed memory type parallel computer mentioned above, in the set process and the clear process of the FLAG executing before and after the write data transfer command between computing nodes, the computing nodes must access the network long distance. Therefore, there is a problem that overhead before and after the write data transfer becomes large.

Moreover, the CPU in the remote node continues to issue a flag read command to the RCU, and the remote node accesses the network long distance. Consequently, there is a problem of too much overhead time from the end of the write data transfer to the confirmation of the end of the write data transfer in the CPU in the remote node.

In order to solve these problems, there are two methods to be studied. As a first method, at the CPU in the local node, if the set and clear processes of the FLAG can be eliminated, the local node can execute the write data transfer and end at an earlier time.

As a second method, at the remote node, if the write data transfer confirming FLAG does not exists in the network, but exists in a position near the remote node, its turn around time can be reduced. Consequently, the process confirming the FLAG is made faster, and after the end of the write data transfer, it becomes possible to jump to the next subroutine at an earlier time.

As mentioned above, if these two methods are realized, at the distributed memory type parallel computer, confirming the end of the write data transfer at the remote node is made faster.

SUMMARY OF THE INVENTION

It is therefore an object of the present invention to provide a distributed memory type parallel computer and a write data transfer end confirming method thereof, in which a CPU in a local node has a main role and a write data transfer from the local node to a remote node is executed and a series of processes leading to a CPU in the remote node confirming the end of the write data transfer is made to be faster.

According to a first aspect of the present invention, there is a distributed memory type parallel computer, in which plural computing nodes comprising a CPU (central processing unit), a PMU (primary memory unit), and a RCU (remote control unit) are connected through a network, and data are transferred from an arbitrary computing node to the other computing nodes. A command expressing an end of transfer of the data is added to the data that are transferred from a first computing node to other computing nodes.

According to a second aspect of the present invention, in the first aspect, in the arbitrary computing node, the CPU issues an EOT (end of transfer) command expressing an end of transfer of the data to the RCU, and the RCU obtains transfer data stored in the PMU, when the RCU accepts the EOT command from the CPU; a way of adding the EOT command to the transfer data, and a way of transferring the transfer data added the EOT command to one of the other computing nodes.

According to a third aspect of the present invention, in the first aspect, in each of the other computing nodes, the RCU has a first accepting section for accepting a command and an address of the transfer data, which is transferred from the RCU in the arbitrary computing node, and for latching the command and the address, a second accepting section for accepting the transfer data transferred from the RCU in the arbitrary computing node, and for latching the transferred data, an arbitrating section for arbitrating the command and the address of the transfer data accepted at the first accepting section, an address transforming section for transforming the address arbitrated at the arbitrating section, a judging section for judging whether the command arbitrated at the arbitrating section is an EOT command issued at the CPU in the arbitrary computing node or not, a replacing section for replacing a part of the transfer data accepted at the second accepting section with a designated value expressing that the transfer data was transferred with the EOT command, in case the command was the EOT command, and a storage section for storing the transfer data whose part was replaced with the designated value at the replacing section and the address transformed at the address transforming section in the PMU.

According to a fourth aspect of the present invention, in the third aspect, in each of the other computing nodes, the CPU provides a monitor for monitoring a state that a part of the transfer data is replaced with the designated value and the transfer data whose part was replaced are stored in the PMU by the storage section, and a data transfer end notifying section for notifying the end of transfer of the transfer data to the arbitrary computing node, when the transfer data whose part was replaced with the designated value had been stored in the PMU, based on a monitored result at the monitoring means.

According to a fifth aspect of the present invention, in the third aspect, the replacing section replaces a first element of the transfer data accepted at the second accepting section with the designated value.

According to a sixth aspect of the present invention, in the third aspect, the replacing section replaces a final element of the transfer data accepted at the second accepting section with the designated value.

According to a seventh aspect of the present invention, there is provided a write data transfer end confirming method at a distributed memory type parallel computer, in which plural computing nodes providing a CPU, a PMU, and a RCU are connected through a network, and data are transferred from a first computing node to other computing nodes. In the first computing node, providing the steps of issuing an EOT (end of transfer) command expressing an end of transfer of the data from the CPU to the RCU, obtaining transfer data stored in the PMU, when the RCU accepted the EOT command from the issuing step, adding the EOT command to the transfer data obtained at the obtaining step, and transferring the transfer data added the EOT command to one of the other computing nodes. And in each of the other computing nodes, providing the steps of first accepting a command and an address of the transfer data, which is transferred from the transferring step at the arbitrary computing node, and for latching the command and the address, second accepting the transfer data transferred from the transferring step at the arbitrary computing node, and for latching the transferred data, arbitrating the command and the address of the transfer data accepted at the first accepting step, transforming the address arbitrated at the arbitrating step, judging whether the command arbitrated at the arbitrating step is an EOT command issued at the CPU in the arbitrary computing node or not, replacing a part of the transfer data accepted at the second accepting step with a designated value expressing that the transfer data was transferred with the EOT command, at the case that the judging step judged that the command was the EOT command, memorizing the transfer data whose part was replaced with the designated value at the replacing step and the address transformed at the transforming step in the PMU, monitoring a state that a part of the transfer data is replaced with the designated value and the transfer data whose part was replaced are stored in the PMU by the memorizing step at the CPU, and notifying the end of transfer of the transfer data to the arbitrary computing node, when the transfer data whose part was replaced with the designated value had been stored in the PMU, based on a monitored result at the monitoring means.

According to an eighth aspect of the present invention, in the seventh aspect, the replacing step replaces a first element of the transfer data accepted at the second accepting step with the designated value.

According to ninth aspect of the present invention, in the seventh aspect, the replacing step replaces a final element of the transfer data accepted.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
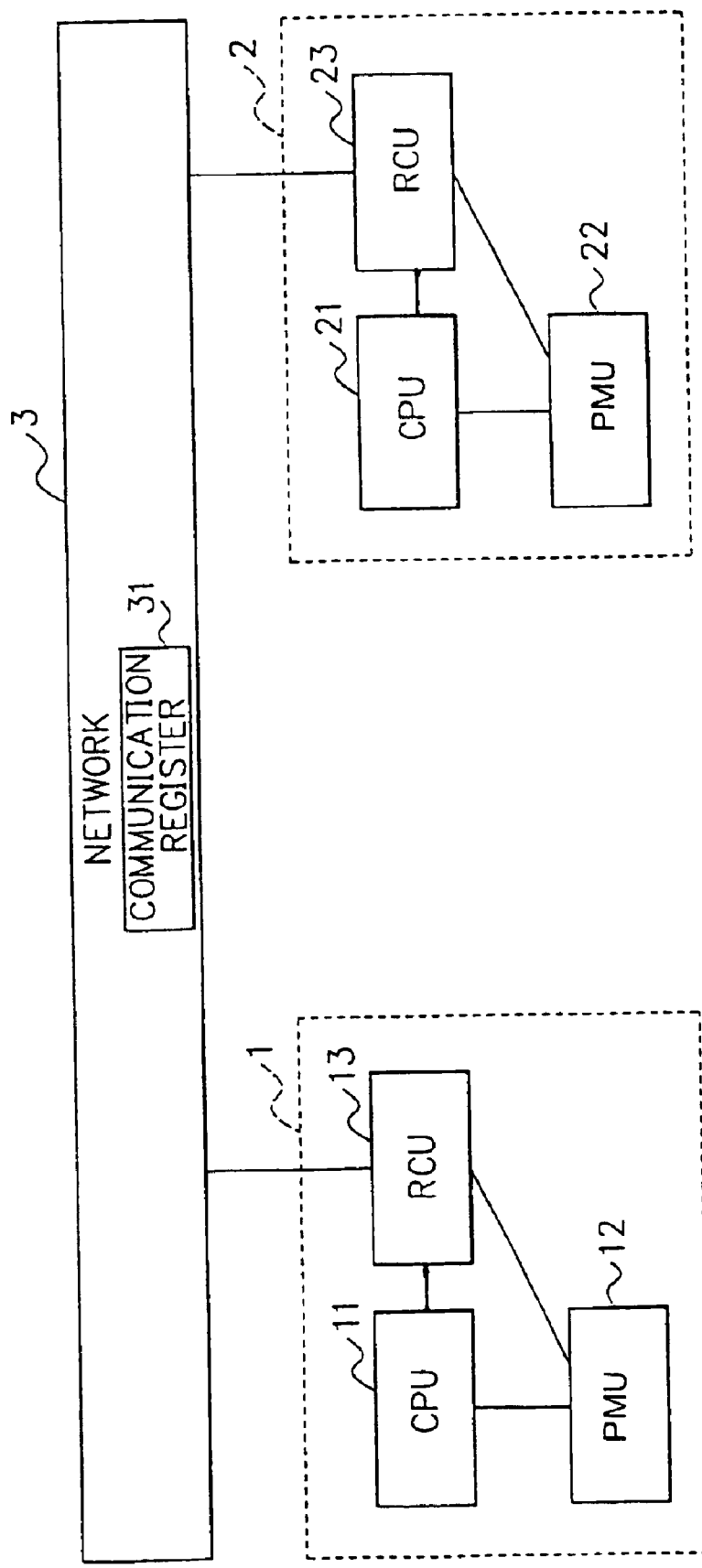
FIG. 1 is a block diagram showing a structure of a conventional distributed memory type parallel computer.
Figure 2:
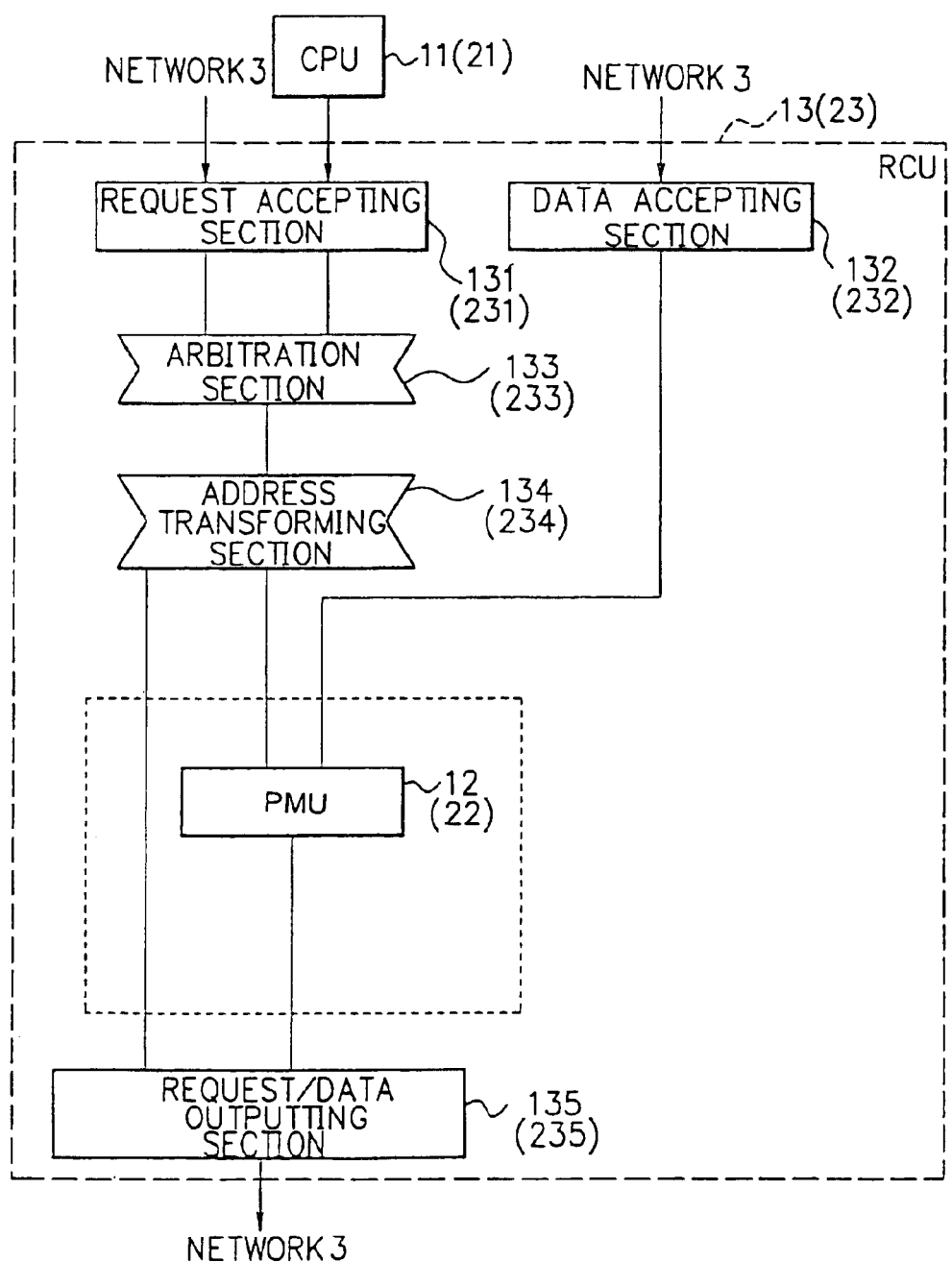
FIG. 2 is a block diagram showing a detailed structure of an RCU in a computing node of the conventional distributed memory type parallel computer.
Figure 3:
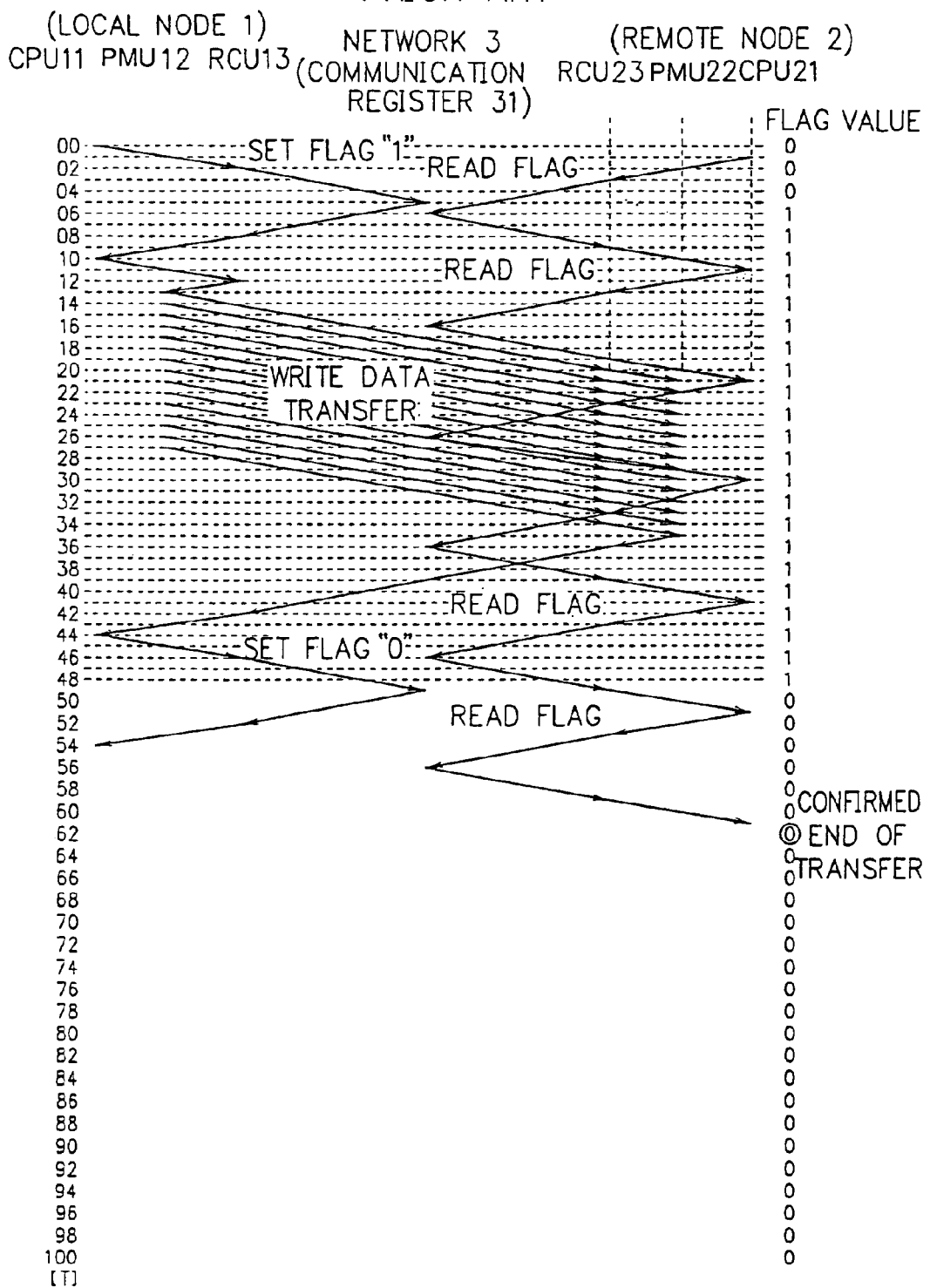
FIG. 3 is a timing chart showing operation of the conventional distributed memory type parallel computer.

Referring now to the drawings, embodiments of the present invention are explained in detail. At the embodiments of the present invention, a function being almost equivalent to the conventional example has the same reference number as the conventional example.

Figure 4:
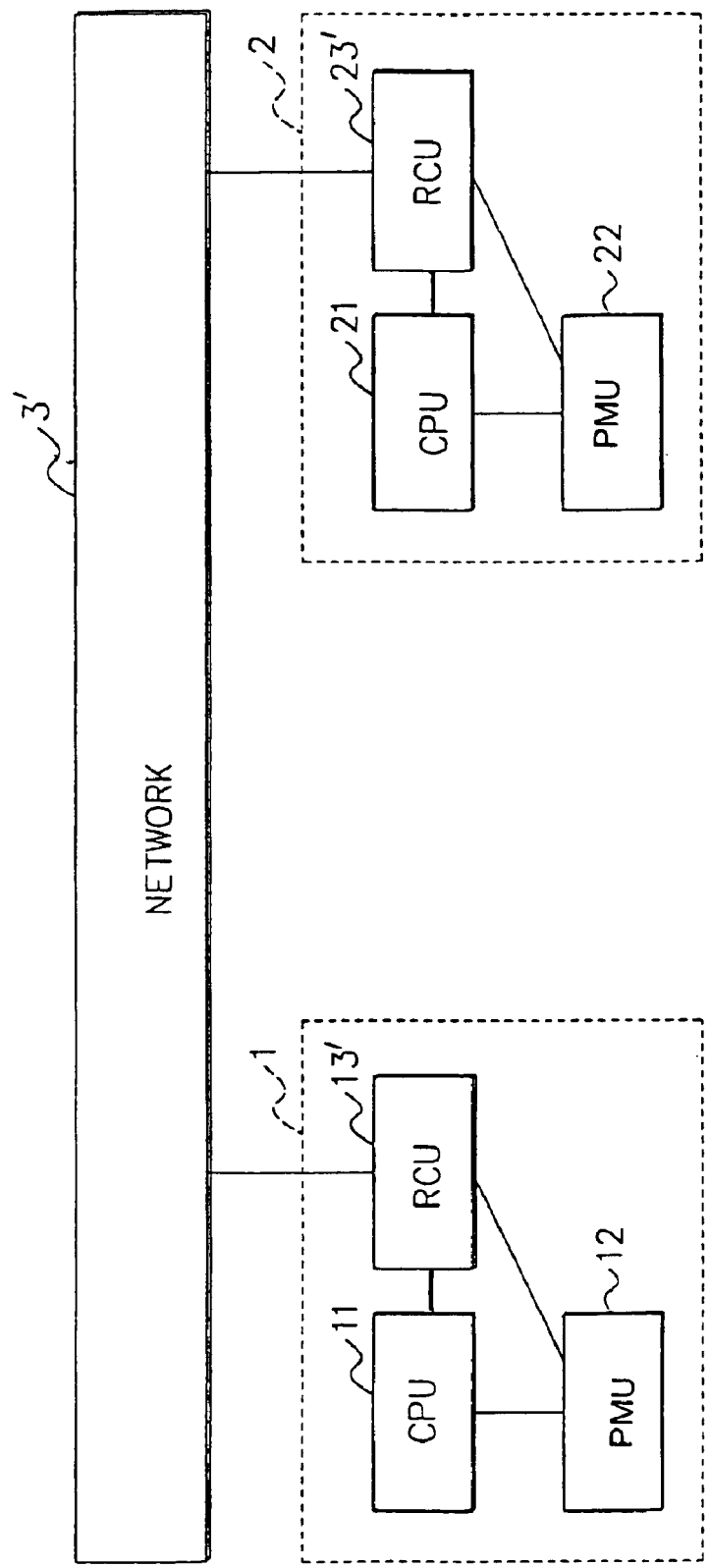
FIG. 4 is a block diagram showing a structure of an embodiment of a distributed memory type parallel computer of the present invention.

FIG. 4 is a block diagram showing a structure of an embodiment of a distributed memory type parallel computer of the present invention. As shown in FIG. 1, the distributed memory type parallel computer of the present invention consists of a first computing node 1 (hereinafter referred to as a local node 1), a second computing node 2 (hereinafter referred to as a remote node 2), and a network 3 that connects the first and second computing nodes 1 and 2. In this, the first computing node 1 is explained as the local node 1, however, the first computing node 1 is not limited to the local node 1 and can work as a remote node. Further, in order to make the explanation concise, the number of computing nodes is two in this explanation, however this number is not limited two, and actually two or more computing nodes are connected to the network 3.

The local node 1 consists of a CPU 11, a PMU 12, and a RCU 13'. And the remote node 2 consists of a CPU 21, a PMU 22, and a RCU 23' as the local node 1. The network 3 connects the local node 1 and the remote node 2. In this, the RCU 13' receives commands from the CPU 11 through the PMU 21, and the RCU 23' receives commands from the CPU 21 through the PMU 22.

Figure 5:
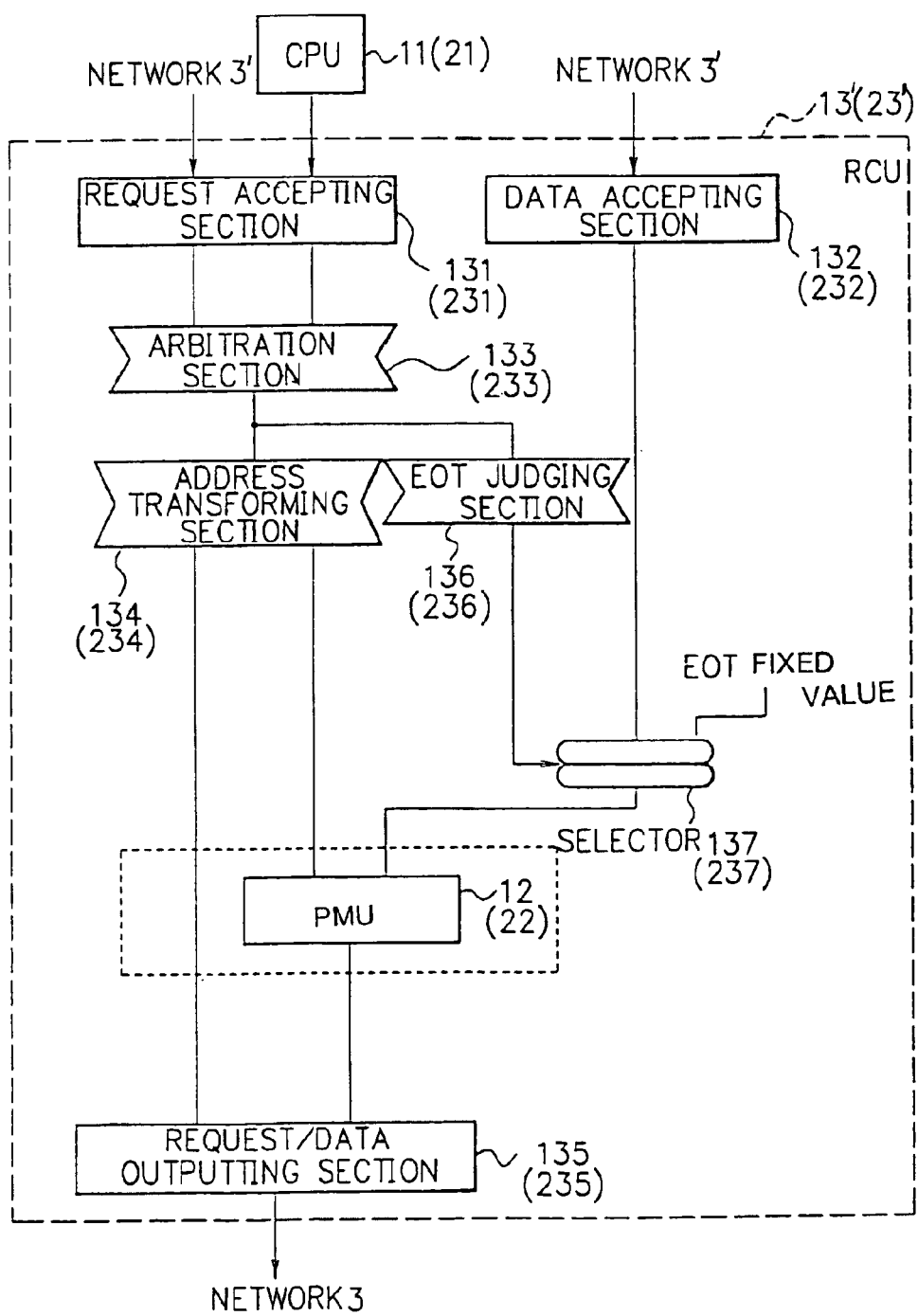
FIG. 5 is a block diagram showing a detailed structure of an RCU in a computing node of the embodiment of the distributed memory type parallel computer of the present invention.

FIG. 5 is a block diagram showing a detailed structure of the RCU 13' (23') in the computing node 1 (2) of the embodiment of the distributed memory type parallel computer of the present invention. As shown in FIG. 5, the RCU 13' (23') of the embodiment of the distributed memory type parallel computer of the present invention consists of a request accepting section 131 (231), a data accepting section 132 (232), an arbitration section 133 (233), an address transforming section 134 (234), a request/data outputting section 135 (235), an EOT (end of transfer) judging section 136 (236), and a selector 137 (237). In this, the EOT judging section 136 (236) and the selector 137 (237) work at the remote node 2, however, the local node 1 can also work as a remote node, therefore the RCU 13' (23') has the same functions.

At the embodiment of the present invention, in order to make a high-speed write data transfer end confirmation at the remote node 2, a function issuing a write data transfer command with an EOT mark is newly provided, and the write data transfer command with the EOT mark is issued at the CPU 11 in the local node 1.

In this embodiment, when the write data transfer command with the EOT mark is received at the remote node 2, a value of a first element of data to be transferred is replaced with an EOT fixed value at the RCU 23' in the remote node 2 and this EOT fixed value is written in the PMU 22. This EOT fixed value is, for example, "All 1" and at 4 byte data, this fixed value is "FFFFFFFF" in hexadecimal, and at 8 byte data, this fixed value is "FFFFFFFFFFFFFFFF" in hexadecimal.

If this first element is replaced with the EOT fixed value, it is necessary that the mapping is executed so that the EOT fixed value can be written. In order to realize this, at the RCU 23 in the remote node 2, the EOT judging section 236 that recognizes the transfer command to be a write data transfer command with an EOT mark, and the selector 237 that replaces the first element of the transfer data with the EOT fixed value, are newly provided. Compared to the conventional example, the two functions=the EOT judging section 136 (236) and the selector 137 (237), are newly added to the present invention.

The request accepting section 231 in the RCU 23' accepts a command from the CPU 21, or a command and an address from the RCU 13' through the network 3 and latches the command and the address. The data accepting section 232 in the RCU 23' accepts write data transferred from the RCU 13' through the network 3 and latches the data. The arbitration section 233 selects one of the requests (commands and addresses) in the request accepting section 231 one by one, by arbitrating.

The address transforming section 234 transforms a logical node number into a physical node number, and a local job number into a remote job number, and a logical address in the node into a physical address in the node. The physical node number transformation and the remote job number transformation are needed for a command when the remote node 2 accesses the other node (in this case, the local node 1). The physical address in node transformation is needed for a command accessing a memory in the node (in this case, the PMU 22).

The request/data outputting section 235 outputs the command and address transformed at the address transforming section 234 and the loaded data from the PMU 22 to the other node (the RCU 13' through the network 3). The data latched at the data accepting section 232 are needed in case the data are to be stored in the PMU 22 from the other node (the RCU 13' through the network 3).

Next, the EOT judging section 236 and the selector 237 in the remote node 2 of the present invention are explained in detail.

The EOT judging section 236 is a circuit that recognizes a received command to be a write data transfer command with an EOT mark. When the received command is the write data transfer command with the EOT mark, the EOT judging section 236 instructs the selector 237 so that the first element of the transferred data is replaced with the EOT fixed value.

The selector 237 is usually connected to the data accepting section 232. When the selector 237 receives an instruction from the EOT judging section 236 so that the first element data of the transferred data is replaced with the EOT fixed value, the selector 237 replaces the first element of the transferred data with the EOT fixed value. In this, the EOT fixed value is a fixed value, at 4 byte data, "FFFFFFFF" in hexadecimal, and at 8 byte data, "FFFFFFFFFFFFFFFF" in hexadecimal.

Figure 6:
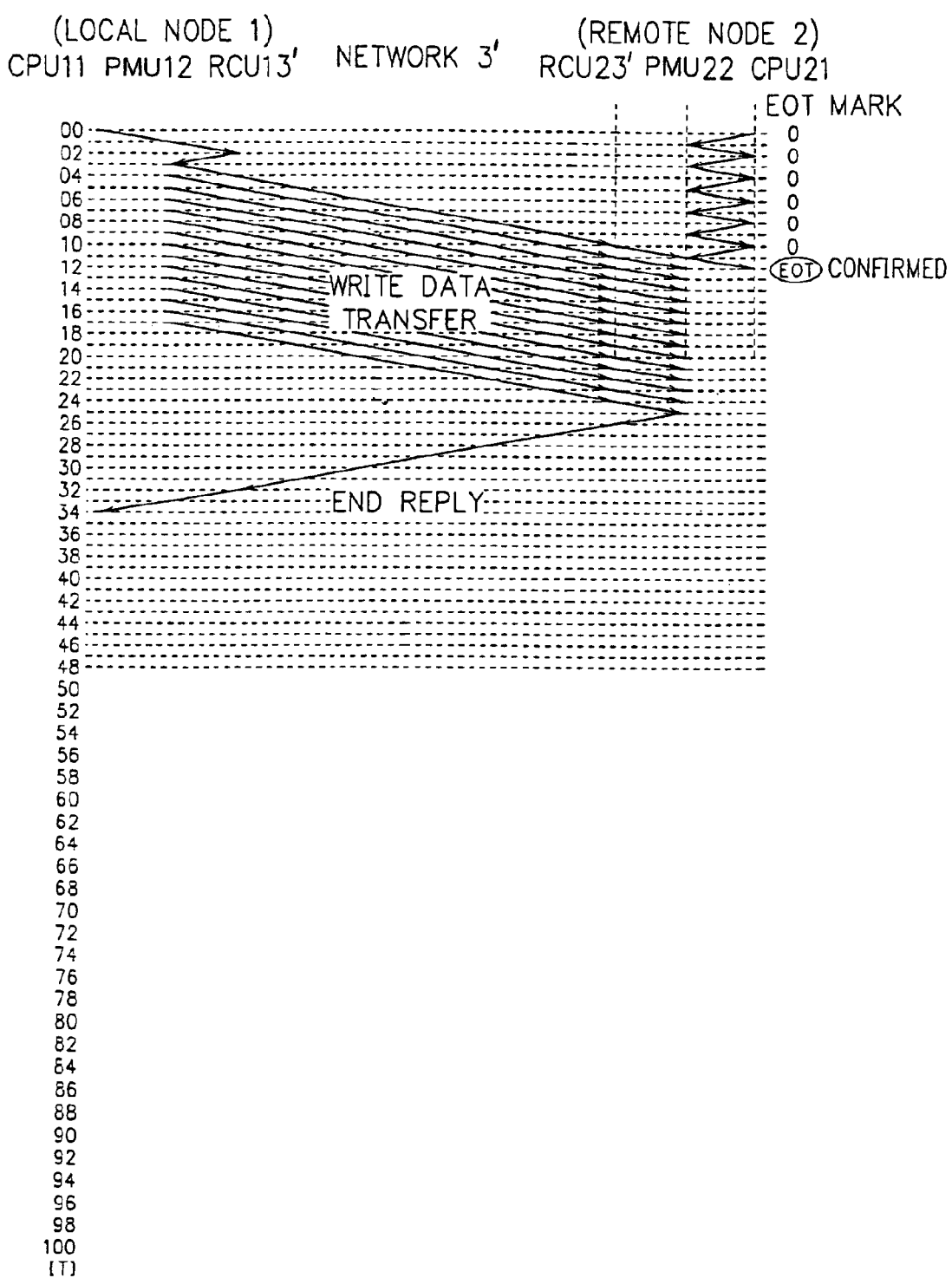
FIG. 6 is a timing chart showing operation of the embodiment of the distributed memory type parallel computer of the present invention.

FIG. 6 is a timing chart showing operation of the embodiment of the distributed memory type parallel computer of the present invention. Referring to FIG. 6, the operation of the local node 1 and the remote node 2 at the embodiment of the distributed memory type parallel computer of the present invention is explained.

At the local node 1, the CPU 11 issues a write data transfer command with an EOT mark to the RCU 13'. The RCU 13' loads data to be transferred (array NODE 1 (I)) from the PMU 12 and transfers the data to the RCU 23' through the network 3.

At the RCU 23', the EOT judging section 236 recognizes the write data transfer command transferred through the network 3 to be the write data transfer command with the EOT fixed value. And the selector 237 replaces the first element of the transferred data with an EOT mark (at 4 byte data, "FFFFFFFF" in hexadecimal, and at 8 byte data, "FFFFFFFFFFFFFFFF" in hexadecimal). And the transferred data are stored in the PMU 22.

The RCU 23' sends an end reply notifying that the write data transfer command with the EOT mark ended normally to the RCU 13'. The RCU 13' sends this end reply to the CPU 11. With this, the operation of the local node 1 ends.

At this time, at the CPU 21, a confirming process of the EOT mark is repeated by reading the first element of the transferred data in the PMU 22. And when the read data is confirmed to be the transferred data with the EOT mark, the CPU 21 recognizes that the write data transfer command ends. And the CPU 21 goes to the next sequence and a series of this operation ends.

As mentioned above, FLAG writing processes between the CPU 11 in the local node 1 and the network 3, that is, setting and clearing processes of the FLAG are not required at the present invention. Further, instead of a FLAG reading process (confirming the value of the FLAG) between the CPU 21 in the remote node 2 and the network 3, a reading process of a fixed address of the EOT mark in the PMU 22 in the remote node 2 is executed, therefore, a series of the operation can be made to be high speed.

Referring to FIGS. 4 to 6, operation of write data transfer end confirmation at the remote node 2 at the time when write data transfer is executed at the distributed memory type parallel computer of the present invention is explained in detail.

First, at the local node 1, the CPU 11 issues a write data transfer command with an EOT mark to the RCU 13' for the PMU 22 in the remote node 2.

At the RCU 13', the request accepting section 131 accepts the write data transfer command with the EOT mark, and the arbitration section 133 arbitrates the request (write data transfer command with EOT mark), and the address transforming section 134 executes the physical node number transformation, the remote JOB number transformation, and the physical address in unit transformation. And the RCU 13 accesses to the PMU 12. And the request/data outputting section 135 outputs the loaded data from the PMU 12 together with the physical node number and the remote JOB number to the RCU 23 through the network 3.

Next, in the remote node 2, at the RCU 23', the request accepting section 231 accepts the write data transfer command with the EOT mark from the RCU 13' through the network 3. After this the arbitration section 233 arbitrates the request (write data transfer command with EOT mark), and the address transforming section 234 executes the physical address transformation. At the same time, the EOT judging section 236 recognizes that the transferred command is the write data transfer command with the EOT mark. And the selector 237 is instructed so that the first element of the transferred data is replaced with the EOT fixed value.

And the transferred data are accepted at the data accepting section 232, and the first element of the transferred data is replaced with the EOT fixed value at the selector 237, and the transferred data are written in the PMU 22 together with the physical address.

At the RCU 23', the request/data outputting section 235 outputs an end reply signifying that the write data transfer command with the EOT mark from the RCU 13' and the write data transfer process to the PMU 22 end normally to the RCU 13' through the network 3. The RCU 13' returns this end reply to the CPU 11. With this, the write data transfer command with the EOT mark ends.

The CPU 21 in the remote node 2 reads an address, in which the EOT fixed value should be written in the PMU 22, and checks the address. This process is repeated until the EOT fixed value is written in the address, in which the EOT fixed value should be written in the PMU 22. After writing the EOT fixed value in the PMU 22 from the RCU 23', the CPU 21 confirms this and recognizes that the write data transfer command ends. After this, the CPU 21 goes to the next sequence (NEXT_PROGRAM_SUB) and a series of this operation ends.

The latency between units and in each of the units is defined as follows. T corresponds to one machine clock at the distributed memory type parallel computer of the present invention.

1. The latency between the CPU (11,21) and the PMU (12,22): 1T
2. The latency between the PMU (12,22) and the RCU (13',23'): 1T
3. The latency between the network 3 and the RCU (13',23'): 3T
4. The latency passing through each of the units: 0T At this time, at the distributed memory type parallel computer of the present invention, the latency from the local node 1 issuing the write data transfer command to the remote node 2 confirming the write data transfer end, that is, to the CPU 21 confirming the EOT mark in the PMU 22, is 12T as shown in FIG. 6.

Figure 7:
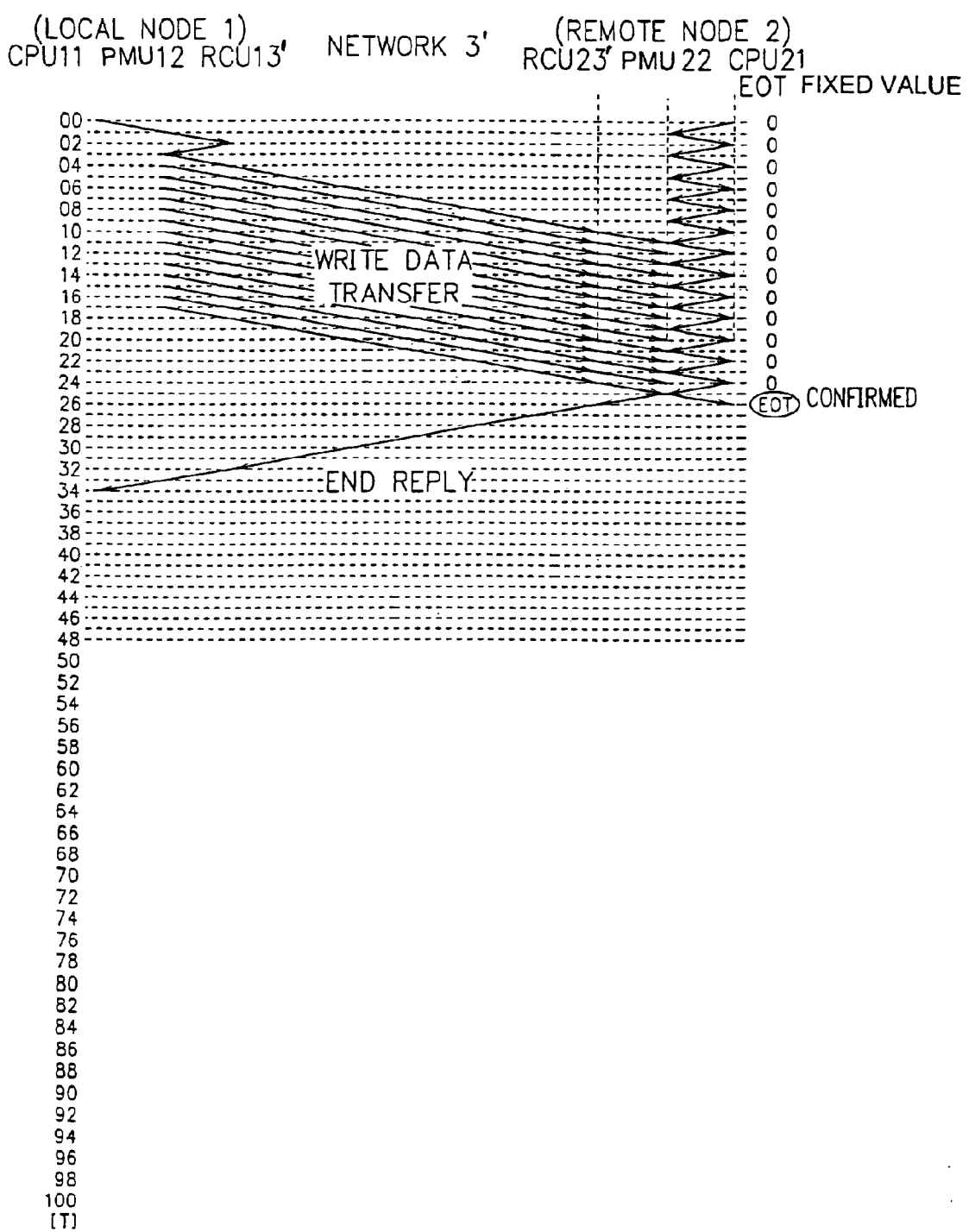
FIG. 7 is a timing chart showing operation of another embodiment of the distributed memory type parallel computer of the present invention.

FIG. 7 is a timing chart showing operation of another embodiment of the distributed memory type parallel computer of the present invention. The difference from the embodiment mentioned above is that the position of the EOT mark in the transfer data is changed at this embodiment. In the embodiment mentioned above, the first element of the transferred data is replaced with the EOT fixed value. In this embodiment, the final element of the transferred data is replaced with the EOT fixed value.

First, at the local node 1, the CPU 11 issues a write data transfer command with an EOT mark for the PMU 22 in the remote node 2 to the RCU 13'.

At the RCU 13', the request accepting section 131 accepts the write data transfer command with the EOT mark, and the arbitration section 133 arbitrates the request (write data transfer command), and the address transforming section 134 executes the physical node number transformation, the remote JOB number transformation, and the physical address in unit transformation. And the RCU 13' accesses the PMU 12. The request/data outputting section 135 outputs the load data from the PMU 12 together with the physical node number and the remote JOB number to the RCU 23' through the network 3.

Next, in the remote node 2, at the RCU 23', the request accepting section 231 accepts the write data transfer command with the EOT mark from the RCU 13' through the network 3. After this, the arbitration section 233 arbitrates the request (write data transfer command with EOT mark), and the address transforming section 234 executes the physical address transformation. At the same time, the EOT judging section 236 recognizes that the transferred command is the write data transfer command with the EOT mark. And the selector 237 is instructed so that the final element of the transferred data is replaced with the EOT fixed value.

And the transferred data are accepted at the data accepting section 232, and the final element of the transferred data is replaced with the EOT fixed value at the selector 237, and the transferred data are written in the PMU 22 together with the physical address.

At the RCU 23', the request/data outputting section 235 outputs an end reply signifying that the write data transfer command with the EOT mark from the RCU 13' and the write data transfer process to the PMU 22 end normally at the RCU 13' through the network 3. The RCU 13' returns this end reply to the CPU 11. With this, the write data transfer command with the EOT mark ends.

The CPU 21 in the remote node 2 reads an address, in which the EOT fixed value should be written in the PMU 22 and checks the address. This process is repeated until the EOT fixed value is written at the address, in which the EOT fixed value should be written in the PMU 22. After writing the EOT fixed value in the PMU 22 from the RCU 23', the CPU 21 confirms this and recognizes that the write data transfer command ends. After this, the CPU 21 goes to the next sequence (NEXT_PROGRAM_SUB) and a series of this operation ends.

At this time, at this embodiment of the distributed memory type parallel computer of the present invention, the latency from the local node 1 issuing the write data transfer command to the remote node 2 confirming the write data transfer command end, that is, to the CPU 21 confirming the EOT mark in the PMU 22, is 26T.

The embodiments mentioned above are preferred embodiments of the present invention, and can be modified to various embodiments without departing from the spirit of the present invention.

For example, the latency between units and in each of the units is explained as fixed values, however the values are not limited to the values mentioned above.

And at the embodiments mentioned above, one element of the transfer data has 4 byte width or 8 byte width, however, this data width is not limited to the widths mentioned above.

As mentioned above, according to the distributed memory type parallel computer and the write data transfer end confirming method thereof at the present invention, processes before and after the write data transfer by a CPU in a local node can be eliminated. In the described embodiments, the process before the write data transfer is a FLAG, which signifies that data is being transferred to the CPU in the remote node and is set to "1". The process after the write data transfer is a FLAG, which signifies that the write data transfer to the CPU in the remote node ends and it is set to "0". Since an RCU in the remote node provides an EOT judging section and a selector, and a transfer end mark is added to the transferred data themselves, it is enough for the CPU in the remote node to confirm the transferred data.

Moreover, according to the distributed memory type parallel computer and the write data transfer end confirming method thereof at the present invention, a write data transfer end confirming process by the CPU in the remote node can be executed in high speed since the CPU in the remote node provides the EOT judging section and the selector, and the transfer end mark can be added to the transferred data themselves. Therefore, when the write data transfer end is confirmed, it is enough for the CPU in the remote node to only access an EOT mark written address in the PMU in the same remote node. Consequently turn around time of the confirmation can be largely reduced.

Furthermore, according to the distributed memory type parallel computer and the write data transfer end confirming method thereof at the present invention, the write data transfer end confirming process can be executed in high speed. Therefore, the next sequence after the write data transfer to the remote node can be executed at an earlier time, and the total performance can be improved. Since at a distributed memory type program the write data transfer process for the PMU in the remote node is executed frequently, the executing time of the total program can be reduced by the reduction of the time of the write data transfer end confirming process.

According to the distributed memory type parallel computer and the write data transfer end confirming method of the present invention, this method can be applied to general logic at exclusive access control. That is, generally, in case a user desires to read data in a certain position but the user cannot read the data until the latest data arrives, when this transfer with an EOT mark is applied to a disk, the user can read the latest data at a high speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A distributed memory type parallel computer, having plural computing nodes wherein each computing node comprises:

a CPU (central processing unit);

a PMU (primary memory unit); and a RCU (remote control unit) wherein said CPU, PMU and RCU are connected together and connected to a network, wherein data are transferred from first a computing node to a second computing nodes, and wherein:

a command expressing an end of transfer (EOT) of said data is added to said data that are transferred from said first computing node to said second computing node; and wherein said second computing node recognizes said EOT and, in response thereto, stores an EOT fixed value in a predetermined target address of said PMU of said second computing node, and wherein:

said CPU of said second computing node periodically accesses said target address and recognizes an end of data transfer when the value stored at said target address is said EOT fixed value.

2. A distributed memory type parallel computer in accordance with claim 1, wherein:

said CPU in said first computing node, comprises:
an issuing means for issuing an EOT (end of transfer) command expressing an end of transfer of said data to said RCU in said first computing node, wherein said RCU comprises:
a data obtaining means for obtaining transfer data stored in the PMU in said first computing node when the RCU accepts said EOT command;
an adding means for adding said EOT command to said transfer data obtained at said data obtaining means; and
a transferring means for transferring said transfer data with said EOT command to said second computing nodes.

3. A distributed memory type parallel computer in accordance with claim 2, wherein:

said RCU in said second computing node comprises:
a first accepting means of accepting a command and a target address of said transfer data, which is transferred from the transferring means of the RCU in said first computing node, and for latching said command and said address;
a second accepting means of accepting said transfer data transferred from said transferring means of the RCU in said first computing node, and for latching said transferred data;
an arbitrating means for arbitrating said command and said target address of the transfer data accepted by said first accepting means;
an address transforming means for transforming said target address arbitrated at said arbitrating means;
a judging means for judging whether said command arbitrated at said arbitrating means is an EOT command issued at said CPU in said first computing nodes;
a replacing means for replacing a part of said transfer data accepted at said second accepting means with an EOT fixed value expressing that said transfer data with said EOT command was transferred, if the said judging means judged that said command was said EOT command; and
storing means for storing said transfer data with said EOT fixed value and said target address in said PMU.

4. A distributed memory type parallel computer in accordance with claim 3, wherein:

said CPU in said second computing node comprises:
a monitoring means for monitoring whether the part of said transfer data accepted at said second accepting means is replaced with said EOT fixed value and whether said transfer data with the EOT fixed value are stored in said PMU by said storing means; and
a data transfer end notifying means for notifying the first computing node of the end of transfer of said transfer data, after the monitoring means confirms that the said transfer data with the EOT fixed value are stored in said PMU.

5. A distributed memory type parallel computer in accordance with claim 3, wherein:

said replacing means replaces a first element of said transfer data accepted at said second accepting means with said EOT fixed value.

6. A distributed memory type parallel computer in accordance with claim 3, wherein:

said replacing means replaces a final element of said transfer data accepted at said second accepting means with said EOT fixed value.

7. A distributed memory type parallel computer in accordance with claim 1, wherein:

said RCU in said second computing node comprises:
a first accepting means of accepting a command and a target address of said transfer data, which is transferred from the transferring means of the RCU in said first computing node, and for latching said command and said address;
a second accepting means of accepting said transfer data transferred from said transferring means of the RCU in said first computing node, and for latching said transfer data;
an arbitrating means for arbitrating said command and said target address of the transfer data accepted by said first accepting means;
an address transforming means for transforming said target address arbitrated at said arbitrating means;
a judging means for judging whether said command arbitrated at said arbitrating means is an EOT command issued at said CPU in said first computing node;
a replacing means for replacing a part of said transfer data accepted at said second accepting means with an EOT fixed value expressing that said transfer data with said EOT command was transferred if the said judging means judged that said command was said EOT command; and
a storing means for storing said transfer data with said EOT fixed value and said target address in said PMU.

8. A write data transfer end confirming method in a distributed memory type parallel computer, having a plurality computing nodes wherein each computing node comprises:

a CPU (central processing unit);
a PMU (primary memory unit); and
a RCU (remote control unit); wherein said CPU, PMU and RCU are connected together and connected to a network, wherein data are transferred from a first computing node to a second computing node, and wherein:

performing in said first computing node the steps of:
issuing an end of transfer (EOT) command expressing an end of transfer of said data from said CPU to said RCU;
accepting in said RCU said EOT command;
obtaining transfer data stored in said PMU;
adding said EOT command to said transfer data;

transferring said transfer data with said EOT command to a second computing node; wherein performing in said first computing node the steps of:
  accepting a command and a target address of said transfer data that has been transferred from said first computing node, and for latching said command and said target address;
  accepting said transfer data from said first computing node, and for latching said transfer data;
  arbitrating said command and said address of the transfer data;
  transforming said target address arbitrated at said arbitrating step;
  judging whether said command arbitrated at said arbitrating step is an EOT command issued at said CPU in said first computing node;
  replacing a part of the transfer data with an EOT fixed value expressing that the transfer data with the EOT command was transferred, if the said judging step judged that said command was said EOT command;
  storing the transfer data with the EOT fixed value and the target address in said PMU;
  monitoring whether the part of the transfer data is replaced with said EOT fixed value and whether the transfer data with the EOT fixed value are stored in said PMU; and
  notifying the first computing node about the end of transfer of the transfer data after said transfer data with the EOT fixed value are stored in said PMU.

9. A write data transfer end confirming method in a distributed memory type parallel computer in accordance with claim 8, wherein:
  said replacing step replaces a first element of said transfer data accepted at said second accepting step with said EOT fixed value.

10. A write data transfer end confirming method in a distributed memory type parallel computer in accordance with claim 8, wherein:
  said replacing step replaces a final element of said transfer data accepted at said second accepting step with said EOT fixed value.

* * * * *